United States Patent [19]

Tanikella et al.

[11] 3,974,127
[45] Aug. 10, 1976

[54] ALKYLENE OXIDE CONDENSATES OF TETRAMETHYLPIPERIDINE ALCOHOLS OR GLYCOLS

[75] Inventors: Murty S. Tanikella, Newark, Del.; Odorich Von Susani, Geneva, Switzerland

[73] Assignee: E. I. Du Pont de Nemours and Company, Wilmington, Del.

[22] Filed: Sept. 17, 1974

[21] Appl. No.: 506,724

[30] Foreign Application Priority Data

Sept. 17, 1973  Germany............................ 2346734

[52] U.S. Cl............................ 260/75 N; 8/168 C; 252/182; 260/293.9
[51] Int. Cl.[2].................. C08G 63/20; C08G 63/46
[58] Field of Search........................ 260/75 N, 2 BP

[56] References Cited
UNITED STATES PATENTS

| | | | |
|---|---|---|---|
| 2,537,726 | 1/1951 | Wittcoff et al.................... | 260/2 BP |
| 3,352,872 | 11/1967 | Cislak et al....................... | 260/75 N |
| 3,515,698 | 6/1970 | Mauz et al........................ | 260/75 N |
| 3,867,479 | 2/1975 | Spanninger...................... | 260/75 N |

*Primary Examiner*—H.S. Cockeram

[57] ABSTRACT

Alkylene oxide condensates obtained by reacting ethylene oxide and/or propylene oxide with a monohydric 2,2,6,6-tetramethylpiperidine alcohol or a tetramethylpiperidine glycol are useful for introducing basic groups in synthetic polymers. Examples illustrate preparation of a variety of such alkylene oxide condensates which are particularly useful in polyester filaments for imparting acid-dyeability.

10 Claims, No Drawings

ALKYLENE OXIDE CONDENSATES OF TETRAMETHYLPIPERIDINE ALCOHOLS OR GLYCOLS

BACKGROUND OF THE INVENTION

This invention relates to alkylene oxide condensates and more particularly to alkylene oxide condensates of basic compounds.

Alkylene oxide condensates of nitrogen-containing, basic compounds are well known in the art. For example, Shivers, U.S. Pat. No. 2,647,104 discloses that ethylene oxide condensates of aminoalcohols are useful for modifying polyesters to make them susceptible to acid dyes. In Munakata, U.S. Pat. No. 3,624,181 it is disclosed that certain glycols containing a tertiary amino group can be ethoxylated and that polyesters having these condensates incorporated into them have an affinity to acid dyes. However, these and similar condensates suffer from inadequate stability and are not entirely suitable when combined with polyesters at elevated temperatures.

It has now been discovered that nitrogen-containing alkylene oxide condensates of certain cyclic aminoalcohols exhibit excellent compatibility and thermal characteristics when used in polymeric systems.

SUMMARY OF THE INVENTION

The present invention provides alkylene oxide condensates of either 2, 2, 6, 6-tetramethylpiperidine monohydric alcohols or 2, 2, 6, 6-tetramethylpiperidine glycols. They are prepared by condensing ethylene oxide and/or propylene oxide with a tetramethylpiperidine alcohol or glycol. The product is a mixture of condensates in that the total number of alkylene oxide units per tetramethylpiperidine ring is variable and is characterized as an average number. This average may be from about 3 to about 200 units per tetramethylpiperidine ring, preferably 10 to 80 and more preferably 20 to 40. An average of about 20 ethylene oxide units per tetramethylpiperidine ring is usually desirable.

The product consists essentially of 2, 2, 6, 6-tetramethylpiperidine having a substituent at the 1 position and/or a substituent at the 4 position of the tetramethylpiperidine ring, including at least one substituent wherein a condensate of ethylene oxide and/or propylene oxide is attached directly to the tetramethylpiperidine ring or is attached to a group that is attached to the tetramethylpiperidine ring. The substituents are saturated aliphatic hydrocarbons except for the presence of ether oxygen in at least one of the substituents of the tetramethylpiperidine ring. The total number of condensed alkylene oxide units in the mixture of condensates will average 3 to 200 units per tetramethylpiperidine ring.

Typical products are alkylene oxide condensates of 2, 2, 6, 6-tetramethyl-4-hydroxypiperidine, 1-alkyl-2, 2, 6, 6-tetramethyl-4-hydroxypiperidines, 1-alkoxymethyl-2, 2, 6, 6-tetramethyl-4-hydroxypiperidines, 1-hydroxyalkyl-2, 2, 6, 6-tetramethylpiperidines, 1-hydroxyalkoxymethyl-2, 2, 6, 6-tetramethylpiperidines, 1-hydroxyalkyl-2, 2, 6, 6-tetramethyl-4-hydroxypiperidines, 1-hydroxyalkoxymethyl-2, 2, 6, 6-tetramethyl-4-hydroxypiperidines, and 1, 1'-alkylene-bis-(2, 2, 6, 6-tetramethyl-4-piperidinol)s; wherein the alkyl groups may have up to 18 carbon atoms but preferably have 2 to 8 carbon atoms and, more preferably, 2 to 4. These alkylene oxide condensates can be used in polymer systems without any undue reaction or thermal decomposition products that discolor the polymer.

Particularly useful alkylene oxide condensates for use in polyester systems have the formulas:

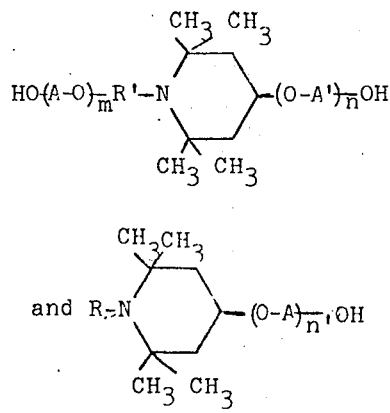

where R is a hydrocarbon group having 1 to 18 carbon atoms and is preferably an alkyl group of 1 to 4 carbon atoms, R' is a divalent saturated aliphatic hydrocarbon group having 2 to 18, preferably 2 to 3, carbon atoms, O-A and O-A' are oxyalkylene groups, preferably oxyethylene groups and m+n and n' are from about 10 to about 80, preferably from about 20 to about 40. The polyether glycols are especially preferred compositions.

The alkylene oxide condensates of the present invention are obtained by the catalyzed reaction of alkylene oxide with a monohydric tetramethylpiperidine alcohol or tetramethylpiperidine glycol having the formulas

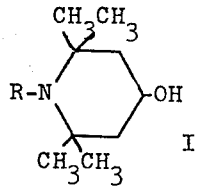
I

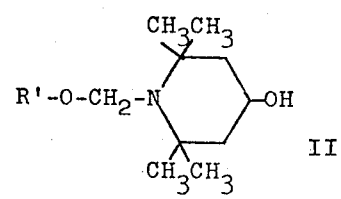
II

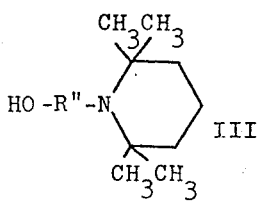
III

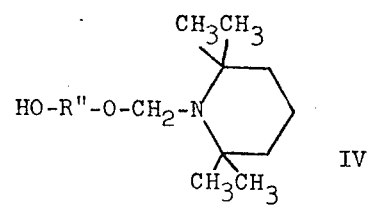
IV

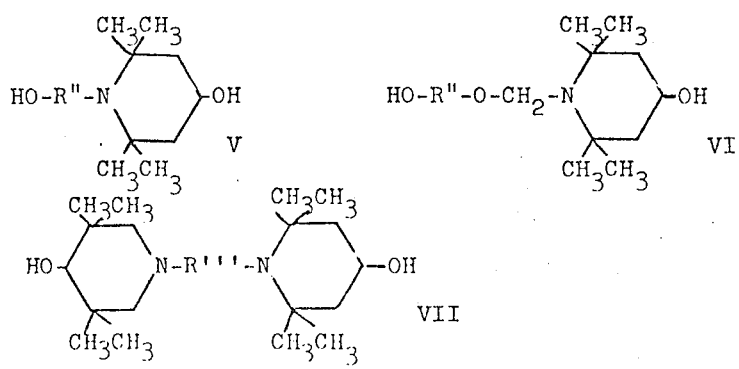

where R is hydrogen or a hydrocarbon group having 1 to 18 carbon atoms, R' is a hydrocarbon group having 1 to 18 carbon atoms, R'' is a divalent saturated aliphatic hydrocarbon group having 2 to 18 carbon atoms and R''' is a divalent hydrocarbon group having 2 to 18, preferably 4 to 8 carbon atoms.

As preferred piperidine alcohols there may be mentioned 2, 2, 6, 6-tetramethyl-4-hydroxypiperidine; 1, 2, 2, 6, 6-pentamethyl-4-hydroxypiperidine; 1-butyl-2, 2, 6, 6-tetramethyl-4-hydroxypiperidine; 1-methoxymethyl-2, 2, 6, 6-tetramethyl-4-hydroxypiperidine; 1-octadecoxymethyl-2, 2, 6, 6-tetramethyl-4-hydroxypiperidine; 1-(2-hydroxyethyl)-2, 2, 6, 6-tetramethyl-4-hydroxypiperidine; 1-(3-hydroxypropyl-2, 2, 6, 6-tetramethyl-4-hydroxypiperidine; 1-(2-methyl-2-hydroxyethyl)-2, 2, 6, 6-tetramethyl-4-hydroxypiperidine; 1-(6-hydroxyhexyl)-2, 2, 6, 6-tetramethyl-4-hydroxypiperidine; 1-(8-hydroxyoctyl)-2, 2, 6, 6-tetramethyl-4-hydroxypiperidine; 1-(18-hydroxyoctadecyl)-2, 2, 6, 6-tetramethyl-4-hydroxypiperidine; 1-(2-hydroxyethoxymethyl)-2, 2, 6, 6-tetramethyl-4-hydroxypiperidine; 1-(6-hydroxyhexoxymethyl)-2, 2, 6, 6-tetramethyl-4-hydroxypiperidine; 1-(12-hydroxydodecoxymethyl)-2, 2, 6, 6-tetramethyl-4-hydroxypiperidine; 1-(2-hydroxyethyl)-2, 2, 6, 6-tetramethylpiperidine; 1-(2-methyl-2-hydroxyethyl)-2, 2, 6, 6-tetramethylpiperidine; 1-(3-hydroxypropyl)-2, 2, 6, 6-tetramethylpiperidine; 1-(2-hydroxyethoxymethyl)-2, 2, 6, 6-tetramethylpiperidine; 1-(6-hydroxyhexoxymethyl)-2, 2, 6, 6-tetramethylpiperidine; 1-(6-hydroxy-2, 4, 4-trimethylhexyl)-2, 2, 6, 6-tetramethylpiperidine; 1-(3-hydroxy-2, 2-dimethylpropoxymethyl)-2, 2, 6, 6-tetramethylpiperidine; 1-(6-hydroxyhexoxymethyl)-2, 2, 6, 6-tetramethylpiperidine; 1-(6-hydroxy-2, 2, 4-trimethylhexoxymethyl)-2, 2, 6, 6-tetramethylpiperidine; 1, 1'-(p-phenylenedimethylene) bis(2, 2, 6, 6-tetramethyl-4-piperidinol; and 1, 1'-(2-butenylene) -bis(2, 2, 6, 6-tetramethyl-4-piperidinol).

Acetone and ammonia are reacted to give triacetone amine which is then catalytically reduced by choice of reduction conditions to 2, 2, 6, 6-tetramethylpiperidine or 2, 2, 6, 6-tetramethyl-4-hydroxypiperidine. The 1-hydrocarbyl derivatives of the 4-hydroxytetramethylpiperidine are obtained by alkylation of methylation of the nitrogen atom. The tetramethylpiperidine alcohols substituted at the 1 position with an omega-hydroxy saturated aliphatic group are obtained by the uncatalyzed reaction of the corresponding secondary amine with an alkylene oxide or by reacting the secondary amine with a halogen-containing alkanol. These reactions are carried out at elevated temperatures and pressures to increase the reaction rate. The alkoxymethyl and the omega-hydroxyalkoxymethyl derivatives are obtained by treating an alkanol or a glycol with the product of the reaction of 2, 2, 6, 6-tetramethyl-4-hydroxypiperidine with a formaldehyde source in the presence of a catalyst at an elevated temperature under a moderate pressure.

The alkylene oxide condensates of the present invention are obtained by reacting an alkylene oxide with a monohydric tetramethylpiperidine alcohol or a tetramethylpiperidine glycol in the presence of a catalyst. As suitable catalysts there may be mentioned potassium hydride, sodium hydride and lithium aluminum hydride. Preferably the reaction is carried out at an elevated temperature and pressure. Mixed alkylene oxides can be used or, if desired, condensation can be carried out with one alkylene oxide to add a given amount of oxyalkylene units and then a different alkylene oxide used for further condensation. Preferably the alkylene oxide is ethylene oxide or a combination of oxides in which ethylene oxide constitutes at least half of the alkylene oxides. The catalyzed addition of an alkylene oxide to one of the above compounds will not produce a single compound, but rather a mixture of compounds having various numbers of oxyalkylene units and, accordingly, such mixtures are characterized by stating an average number of oxyalkylene units. As is known, primary alcohols condense with alkylene oxide at a faster rate than secondary alcohols and thus, when both are present, the final distribution of products will be effected accordingly.

These alkylene oxide condensates will contain from about 3 to about 200, preferably 10 to 80 and more preferably 20 to 40, oxyalkylene units. These condensates are useful for modifying synthetic polymers and are particularly useful for conveying acid-dyeability to polyesters such as, for example, polyethylene terephthalate and ethylene terephthalate copolyesters. The volatility of the piperidine alcohols is such that when they are added to polymer-forming ingredients they tend to be removed with the condensation by-products during the subsequent polymerization. This difficulty is largely or completely alleviated by products of the present invention. In addition, the condensates which contain at least about 10 oxyethylene units have an increased hydrophilicity which appears to lead to their fuller utilization as basic dye sites in polyesters. A high number of oxyalkylene units requires relatively high weight levels of condensates when they are used for modifying polymers and for many purposes, a maximum of about 40 oxyalkylene units are generally adequate. For some purposes, such as modifying the antistatic properties of synthetic polymers, it may be desirable to use condensates having more than 40 oxyalkylene, preferably oxyethylene, units.

The alkylene oxide condensates of this invention may be incorporated into synthetic polymers by adding them to polymer-forming compositions or they may be incorporated into the polymers themselves. When alkylene oxide condensates of this invention having up to 120 oxyethylene units are incorporated into polyester systems, they react and become part of the polyester molecules and thus are not removed by washing, dry cleaning and the like.

In the procedures and examples that follow all percentages given are by weight based on total weight unless indicated otherwise. The examples are presented as illustrations of the invention and are not intended to be limiting as many modifications thereof will be apparent to those skilled in the art.

PREPARATION OF TETRAMETHYLPIPERIDINE ALCOHOLS

Representative procedures for preparation of monohydroxy tetramethylpiperidines and tetramethylpiperidine glycols are given below:

1, 2, 2, 6, 6-Pentamethyl-4-Hydroxypiperidine

A mixture of 18 grams of commercially available 2, 2, 6, 6-tetramethyl-4-hydroxypiperidine, 18 grams of an aqueous solution containing 37% of formaldehyde and 4 milliliters of formic acid containing 1% water is placed in a 100-ml., round-bottomed flask and heated on a steam bath for 7 hours. The contents are cooled, made basic with sodium hydroxide and extracted with ether. The ether extract is dried using anhydrous magnesium sulfate and the ether evaporated. The residue, a white solid, is purified by sublimation at 90°C. at 0.05 torr. The purified 1, 2, 2, 6, 6-pentamethyl-4-hydroxypiperidine has a melting point of 70°–71°C.

1-(1-Butyl)-2, 2, 6, 6-Tetramethyl-4-Hydroxypiperidine

Into a 400-milliliter Hastalloy pressure tube are placed 62.8 grams of 2, 2, 6, 6-tetramethyl-4-hydroxypiperidine and 35.6 grams of 1-bromobutane. The tube and contents are cooled to −78°C., evacuated and filled with nitrogen. The tube is sealed, shaken and warmed to 100°C. for 1 hour, 120°C. for 1 hour and 150°C. for 30 hours. The tube is cooled and the solid charge is removed and placed in a Sohlet extraction apparatus. The material is extracted for 8 hours with diethyl ether. The resulting ether solution is treated with activated charcoal, filtered and concentrated under vacuum. The residue is distilled at 120°–125°C. at 1 torr to give 26 grams of 1-(1-butyl)-2, 2, 6, 6-tetramethyl-4-hydroxypiperidine, a white solid melting at 29°–33°C.

1-Methoxymethyl-2, 2, 6, 6-Tetramethyl-4-Hydroxypiperidine

In a 1-liter stainless steel container are placed 79 grams of 2, 2, 6, 6-tetramethyl-4-hydroxypiperidine, 132 grams of paraformaldehyde and 300 milliliters of pyridine. The flask is evacuated, filled with nitrogen and this process repeated 3 times. The flask is then sealed and heated at 135° to 140°C. for 30 minutes with rocking. The flask is then cooled quickly to room temperature, the contents removed and the mixture filtered. The pyridine is removed from the filtrate on a rotary evaporator. The remaining viscous oil is dissolved in ether, treated with activated charcoal, brought to a boil and filtered. The ether is removed from the filtrate on a rotary evaporator to yield 1-hydroxymethyl-2, 2, 6, 6-tetramethyl-4-hydroxypiperidine as a viscous oil.

This viscous oil is treated with an excess of methanol, and with activated charcoal, boiled, filtered and unreacted methanol removed from the filtrate on a rotary evaporator. The residue is distilled under vacuum with 1-methoxymethyl-2, 2, 6, 6-tetramethyl-4-hydroxypiperidine distilling at 94° to 96°C. at 1.5 torr and crystallizing in the receiving flask.

1-(2-Hydroxyethyl)-2, 2, 6, 6-Tetramethyl-4-Hydroxypiperidine

Method I

A sample of 157 grams of 2, 2, 6, 6-tetramethyl-4-hydroxypiperidine is placed in a 400-milliliter stainless steel bomb, which is cooled to −78°C. The bomb is evacuated, filled with nitrogen at atmospheric pressure, and re-evacuated. The bomb is placed on a scale and connected to a supply of ethylene oxide by a flexible tube. Ethylene oxide is allowed to pass into the bomb until the increase in weight in 52 grams. The bomb is then sealed and disconnected from the ethylene oxide supply. The bomb is held at 110°C. for 1 hour, 120°C. for 1 hour, 130°C. for 1 hour and at 155°–160°C. for 4 hours. The bomb and charge are cooled, and 204 grams of product are removed. The crude material is sublimed twice at 150°C. and <1 torr to give 1-(2-hydroxyethyl)-2, 2, 6, 6-tetramethyl-4-hydroxypiperidine as a white product melting at 180°–183°C.

Additional preparative information for a largerscale practice of this method is given in the section on preparation of piperidine condensates.

Method II

In a heavy-wall, polymer tube is placed 2, 2, 6, 6-tetramethyl-4-hydroxypiperidine and 2-chloroethanol in a molar ratio of 1 to 3. The tube is purged with nitrogen, evacuated and sealed. It is then heated in a salt bath at 160°C. for 1 hour. The contents become a clear solution at 130°–140°C. and start forming the hydrochloride salt at 150°–160°C. At the end of the heating period, the seal of the tube is broken and the contents repeatedly washed with ether to remove the unreacted piperidine. The hydrochloride salt is then dissolved in water and the solution made strongly basic with aqueous potassium hydroxide and extracted 4 times with ether. The four ether layers are combined, dried over potassium carbonate and the ether distilled. The solid, a combination of the unreacted piperidine and the 2-hydroxyethyl derivative, is purified by sublimation at 100°C. at about 0.1-torr. The remaining solid is the 1-(2-hydroxyethyl)-2, 2, 6, 6-tetramethyl-4-hydroxypiperidine and is sublimed at 135°C. at about 0.1-torr. The material melts at 169° to 174°C.

1-(2-Hydroxy-2-Methylethyl)-2, 2, 6, 6-Tetramethyl-4-Hydroxypiperidine

To a 400-milliliter stainless steel bomb is added 117.5 grams of 2, 2, 6, 6-tetramethyl-4-hydroxypiperidine. The bomb and charge are cooled to −78°C., and the bomb is evacuated; filled with nitrogen at atmospheric pressure and re-evacuated. A dropping funnel is attached to the bomb and 60 grams of 1, 2-propylene oxide is added, as determined by the weighing of the bomb before and after the addition. The bomb is then sealed and held at 110°C. for 1 hour, 125°C. for 1 hour, 140°C. for 1 hour and 155°–160°C. for 8 hours. The bomb is then cooled and 164 grams of product is removed. This product is placed in a flask and the pressure reduced to permit the removal of 6 grams of excess propylene oxide yielding 158 grams of 1-(2-hydroxy-2-methylethyl)-2, 2, 6, 6-tetramethyl-4-hydroxypiperidine.

1, 1'-(p-Phenylenedimethylene) Bis(2, 2, 6, 6-Tetramethyl- 4-Piperidinol)

In a 500-milliliter, round-bottomed flask are placed 11.4 grams of α, α'-dibromo-p-xylene, 25.2 grams of 2, 2, 6, 6-tetramethyl-4-hydroxypiperidine and 120 milliliters of diglyme (dimethyl ether of diethylene glycol). The contents are refluxed for 19 hours with vigorous stirring and filtered hot. The diglyme from the filtrate is removed by distillation. The remaining solid is washed with methanol. The solid is then washed repeatedly with ether. The 1, 1'-(p-phenylenedimethylene) bis(2, 2, 6, 6-tetramethyl-4-piperidinol) is obtained as a white crystalline solid, is dried in a vacuum oven and has a melting point of 237°–239°C.

1, 1'-(2-Butenylene) Bis(2, 2, 6, 6-Tetramethyl-4-Piperidinol)

In a 500-milliliter, round-bottomed flask are placed 21.4 grams of 1, 4-dibromo-2-butene, 63 grams of 2, 2, 6, 6-tetramethyl-4-hydroxypiperidine and 200 milliliters of diglyme. The contents are refluxed for 3.5 hours and filtered hot. The diglyme in the filtrate is removed by distillation. The remaining solid is then washed with water. The solid is then dissolved in methanol treated with activated charcoal and filtered. Methanol is removed from the filtrate. The off-white, crystalline solid is dissolved in an acetone/methanol mixture, treated with activated charcoal and filtered. The solvent from the filtrate is removed on a rotary evaporator. The 1, 1'-(2-butenylene) bis(2, 2, 6, 6-tetramethyl-4-piperidinol) is obtained as a white crystalline solid which is dried in a vacuum oven at 80°C. and found to melt at 204°C.

EXAMPLE 1

This example illustrates the preparation of 1, 2, 2, 6, 6-pentamethyl-4-hydroxypiperidine condensed with ethylene oxide in a molar ratio of 1:10.

A 5-liter flask fitted with a thermometer and a capillary nitrogen inlet is weighed, and 766 grams of a composition consisting mostly of 1, 2, 2, 6, 6-pentamethyl-4-hydroxypiperidine is introduced. The setup is warmed to 90°C. and held at 1-2 torr for 0.5-hour to remove water and volatile acidic components, such as carbon dioxide. The charge is cooled and reweighed; the charge residue weighs 742 grams. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The apparatus is purged with nitrogen for 10 minutes, and then heated to a temperature of 80°C. to remelt the residue. With the temperature below 90°C., 1.08 grams of sodium hydride dispersed in 1.08 grams of mineral oil is added. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight of flask and contents after addition. After the addition is complete, the flask is swept with nitrogen and cooled below 50°C. The condenser is removed and the flask weighed. The weight gain is 1914 grams, giving a product having a calculated average of 10.1 oxyethylene units. Acetic acid (2.7 grams) is then added and the mixture is stirred for 10 minutes to quench the catalyst. The product is found to have a neutral equivalent of 623, and is referred to as PHP-10EO.

EXAMPLE 2

This example illustrates the preparation of 1, 2, 2, 6, 6-pentamethyl-4-hydroxypiperidine condensed with ethylene oxide in a molar ratio of 1:20.

This condensate is prepared in the manner described for PHP-10EO. The charge residue weighs 523 grams and 1.52 grams of the sodium hydride dispersion, 2719 grams of ethylene oxide and 1.9 grams of acetic acid are used. The product is a low-melting, waxy material that is calculated to contain 20.3 oxyethylene units.

EXAMPLE 3

This example illustrates the preparation of 1, 2, 2, 6, 6-pentamethyl-4-hydroxypiperidine condensed with ethylene oxide in a molar ratio of 1:28.

This condensate is prepared in the manner described for PHP-10EO. The charge residue weighs 500 grams, and 1.5 grams of the sodium hydride dispersion, 3751 grams of ethylene oxide, and 1.88 grams of acetic acid are used. The product is a wax, of average molecular weight of 1917 grams, which is calculated to have an average of 28.3 oxyethylene units.

EXAMPLE 4

This example illustrates the preparation of 1, 2, 2, 6, 6-pentamethyl-4-hydroxypiperidine condensed with ethylene oxide in a molar ratio of 1:74.

Using the apparatus and procedure described for preparing PHP-10EO, 1, 2, 2, 6, 6-pentamethyl-4-hydroxypiperidine is stripped to remove water and volatile acidic impurities. The weight of the stripped charge is 88.5 grams. The apparatus is then set up for the addition of ethylene oxide as described for PHP-10EO. The charge is purged with nitrogen and 0.25-gram of the sodium hydride dispersion is added. Ethylene oxide, 1142, grams, is added, as determined by weight gain of the apparatus. One half of the charge is removed, and 0.1-gram of the sodium hydride dispersion and 267 grams of ethylene oxide is added to the remainder. Again, the weight of ethylene oxide is determined by weighing the apparatus before and after the addition. The product is calculated to have an average of 74 oxyethylene units, is found to have a neutral equivalent of 3350. The catalyst is quenched by stirring in 0.25-milliliter of acetic acid.

EXAMPLE 5

This example illustrates the preparation of 1, 2, 2, 6, 6-pentamethyl-4-hydroxypiperidine condensed with ethylene oxide in a molar ratio of 1:200.

This condensate is prepared in essentially the same manner described for PHP-10EO. The charge residue, 172 grams, is treated with 0.5 gram of the sodium hydride dispersion and 245.5 grams of ethylene oxide are added. About half of the charge is removed and 602 grams of ethylene oxide added to the remaining portion. About 8 tenths of this product is removed and 728.5 grams of ethylene oxide added to the remaining 2 tenths. The catalyst is quenched with 0.06 gram of acetic acid. The product is calculated to have an average of 1098.6 oxyethylene units.

EXAMPLE 6

This example illustrates the preparation of 1, 2, 2, 6, 6-pentamethyl-4-hydroxypiperidine condensed with two alkylene oxides in a molar ratio of 1:10.

Using the apparatus and conditions described for PHP-10.1EO, 1, 2, 2, 6, 6-pentamethyl-4-hydroxypiperidine is stripped of water and volatile acidic components. The charge is cooled and the flask and contents are re-weighed; the charge is found to weigh 176 grams. The nitrogen bleed is removed and the flask is re-tared and equipped with a stirrer, a Dewar condenser filled with a mixture of dry ice and acetone and topped with an oil-filled bubbler and a pressure-relieving dropping funnel; the thermometer is removed and re-inserted through an adapter provided with a side-arm through which nitrogen can be passed. The flask is purged with nitrogen and 0.25-gram of sodium hydride in 0.25-gram of mineral oil added. The flask is heated to 150°–170°C. and 1, 2-propylene oxide is added to the stirred charge from the dropping funnel at such a rate that only a slow reflux develops. When no further reflux is noted after completing the addition, the charge is cooled under a nitrogen sweep. The flask is weighed and the amount of propylene oxide added is found to be 288 grams. The cooled charge is transferred to the apparatus used for PHP-10.1EO and ethoxylated as described for PHP-10.1EO. The amount of ethylene oxide added is found to be 220 grams. Acetic acid, 0.624-gram, is added and the charge stirred 10 minutes to quench the catalyst. The product is calculated to contain an average of 4.88 oxypropylene units and 4.9 oxyethylene units and is found to have a neutral equivalent of 660. The product contains blocks of the two different oxyalkylene units and is referred to as PHP-5PO-5EO.

EXAMPLE 7

This example illustrates the preparation of 1, 2, 2, 6, 6-pentamethyl-4-hydroxypiperidine condensed with two alkylene oxides in a molar ratio of 1:10.

One mole, 172 grams, 0f 1, 2, 2, 6, 6-pentamethyl-4-hydroxypiperidine, which has been stripped of volatile acidic components as described for PHP-10.1EO, is treated with 0.25-gram of sodium hydride dispersed in 0.25-gram of mineral oil and then with 213.5 grams of ethylene oxide. The cooled charge is then tared with the gas-feed tube removed. The flask is equipped with a stirrer, a side-arm adapter for the thermometer, a pressure-relieving dropping funnel, a Dewar condenser filled with a mixture of dry ice and acetone and topped with an oil-filled bubbler. Nitrogen is passed through the side arm to purge the flask and 1, 2-propylene oxide is added from the dropping funnel at 150°–170°C. at such a rate that only a slow reflux develops in the condenser. The propylene oxide is added with the volume used to estimate the amount of the addition but with weight gain used in the calculation. The charge is cooled under a nitrogen sweep when the addition is complete and no further reflux is noted. An appropriate weighing shows that 285 grams of propylene oxide is added. Acetic acid, 0.62-gram, is added and the contents stirred to quench the catalyst. The product is calculated to contain 4.85 ethylene oxide units and 4.9 propylene oxide units and is found to have a neutral equivalent of 656. This product is similar to PHP-5PO-5EO but the relative position of the blocks is reversed.

EXAMPLE 8

This example illustrates the preparation of 1, 2, 2, 6, 6-pentamethyl-4-hydroxypiperidine condensed with a mixture of two alkylene oxides in a molar ratio of 1:10.

Using the apparatus and conditions described for PHP-10EO, 1, 2, 2, 6, 6-pentamethyl-4-hydroxypiperidine is stripped of water and volatile acidic components. The charge is cooled and the flask is weighed; the charge is found to weigh 86 grams. The flask is then provided with a thermometer, stirrer, gas-feed tube, pressure-relieving dropping funnel and a Dewar condenser filled with a mixture of dry ice and acetone and topped with an oil-filled bubbler. The flask is then purged with nitrogen and 0.25-gram of sodium hydride in 0.25-gram of mineral oil is added. The charge is heated to 150° to 170°C., and a weighed amount, 145 grams, of propylene oxide is added from the dropping funnel at the same time that ethylene oxide is added through the gas-feed tube. When refluxing ceases, the flask is cooled and weighed and the gain in weight is found to be 261 grams, giving, by difference, a weight of 116 grams of ethylene oxide added. Acetic acid, 0.65-gram, is then stirred in to quench the catalyst. The product is calculated to have an average of 5.3 oxyethylene units and 5.0 oxypropylene units and is found to have a neutral equivalent of 735. The product contains a random mixture of oxyethylene and oxypropylene units.

EXAMPLE 9

This example illustrates the preparation of 1, 2, 2, 6, 6-pentamethyl-4-hydroxypiperidine condensed with propylene oxide in a molar ratio of 1:20.

Using the apparatus and conditions described for PHP-10.1EO, 1, 2, 2, 6, 6-pentamethyl-4-hydroxypiperidine is stripped of water and acidic components to give a charge weighing 87 grams. The apparatus is then modified for the addition of 1, 2-propylene oxide as described for PHP-5PO-5EO. The flask is purged with nitrogen and 0.125-gram of sodium hydride dispersed in 0.125-gram of mineral oil added. Propylene oxide is added and the flask is cooled and re-weighed; the charge is found to weight 677.2 grams. The catalyst is then quenched by adding 0.25-gram of acetic acid and stirring for 10 minutes. The product is calculated to have an average of 19.7 oxypropylene units, and is found to have a neutral equivalent of 1333.

EXAMPLE 10

This example illustrates the preparation of 1-butyl-2, 2, 6, 6-tetramethyl-4-hydroxypiperidine condensed with ethylene oxide in a molar ratio of 1:14.

Twenty-six grams of 1-(1-butyl)-2, 2, 6, 6-tetramethyl-4-hydroxypiperidine is ethoxylated using the apparatus described for PHP-10.1EO, except that a 250-milliliter flask is used. The charge is heated to 90°C., nitrogen is passed through for 5 hours, and 0.1-gram of a 50%, by weight, dispersion of sodium hydride in mineral oil is added. The weight of the flask and charge is then determined. The charge is heated to 140°C., ethylene oxide added and the flask swept with nitrogen and weighed. The weight gain shows that 77.5 grams of ethylene oxide is added to give a product calculated to contain 14.4 oxyethylene units. The product is taken up in methanol and 1.5 milliliters of acetic acid is added to quench the catalyst. The solution is treated with activated charcoal and filtered. The solvent is removed at <1 torr at 80° to 90°C. to give a tan, waxy solid.

EXAMPLE 11

This example illustrates the preparation of 1-methoxymethyl-2, 2, 6, 6-tetramethyl-4-hydroxypiperidine condensed with ethylene oxide in a molar ratio of 1:4.

In a 200-milliliter, 3-necked, round-bottomed flask are placed 25.4 grams of 1-methoxymethyl-2, 2, 6, 6-tetramethyl-4-hydroxypiperidine and 0.30 gram of the sodium hydride dispersion. The flask is purged with nitrogen and ethoxylation carried out at 130°C. for 1 hour, at 160°C. for 7 hours and at 170°C. for 7 hours. The ethoxylated product was found to contain 3.86% nitrogen and it is calculated to contain an average of 4.1 oxyethylene units.

EXAMPLE 12

This example illustrates the preparation of 1-(2-hydroxyethyl)-2, 2, 6, 6-tetramethylpiperidine (ETMP) condensed with ethylene oxide in a molar ratio of 1:19.

Into a 5-liter flask equipped with a thermometer, a mechanical stirrer, a gas-feed tube and a vertical condenser having a bubbler attached to its exit tube, is placed 135 grams of 1-(2-hydroxyethyl)-2, 2, 6, 6-tetramethylpiperidine.

The apparatus is weighed, purged with nitrogen and the product melted at 100°C. When the charge is homogeneous, 0.175-gram of sodium hydride in 0.175 gram of mineral oil is added. Ethylene oxide gas is added to the stirred liquid at such a rate that no gas passes through the bubbler. After the addition is complete, the flask is swept with nitrogen, cooled and weighed. It is found that 618 grams of ethylene oxide has been added. The catalyst is then quenched by adding 0.44-gram of acetic acid and stirring for 10 minutes. It is calculated that an average of 19.3 oxyethylene units have been added to the piperidine alcohol. The product is found to have a neutral equivalent of 1002.

EXAMPLE 13

This example illustrates the preparation of 1-(2-hydroxyethyl)-2, 2, 6, 6-tetramethyl-4-hydroxypiperidine (ETHP) condensed with ethylene oxide in a molar ratio of 1:5.

A charge of 100.5 grams of ETHP is placed in the ethoxylation set-up described in Example 12. The apparatus is weighed, purged with nitrogen and the flask and charge are heated to the melting point of ETHP (175°–185°C.). When the charge is homogeneous, 0.25-gram of sodium hydride dispersed in 0.25-gram of mineral oil is added. Ethylene oxide is then added in the manner described in Example 12, until 114.5 grams have been used. As soon as possible during this addition, the temperature is reduced to 145°–155°C., taking care that the charge remains molten. The catalyst is quenched with 0.62-milliliter of acetic acid. The product is an oil of average molecular weight of 430 grams, which is calculated to have an average of 5.2 oxyethylene units added to the piperidine alcohol.

EXAMPLE 14

This example illustrates the preparation of 1-(2-hydroxy-2-methylethyl)-2, 2, 6, 6-tetramethyl-4-hydroxypiperidine condensed with propylene oxide in a molar ratio of 1:5.5.

Into a tared flask equipped with a stirrer, a Dewar condenser filled with a mixture of dry ice and acetone and topped with an oil-filled bubbler, a pressure-relieving dropping funnel and a thermometer inserted through an adapter provided with a side-arm through which nitrogen can be passed, is placed 99 grams of 1-(2-hydroxy-2-methylethyl)-2, 2, 6, 6-tetramethyl-4-hydroxypiperidine. The flask is purged with nitrogen and 0.23 gram of sodium hydride to 0.23 gram of mineral oil is added. The charge is heated to 150°–170°C. and 1, 2-propylene oxide is added to the stirred mixture at a rate which causes only a slow reflux in the condenser. When there is no further refluxing after the addition is complete, 0.57 gram of acetic acid is added to quench the catalyst. After the appropriate weighing, it is found that 123 grams of propylene oxide is added. The product is calculated to have an average of 4.6 oxypropylene units. The product is placed in a container and low-boiling material removed by heating at 250°C. at less than 1 torr. The neutralization equivalent of the residue is found to be 475 and the residue calculated to contain an average of 5.5 oxypropylene units.

EXAMPLE 15

This example illustrates the preparation of 1-(2-hydroxyethyl)-2, 2, 6, 6-tetramethyl-4-hydroxypiperidine condensed with ethylene oxide in a molar ratio of 1:11.

A 5-liter flask fitted with a thermometer and a capillary nitrogen inlet is weighed, and a charge of 199.5 grams of 1-(2-hydroxyethyl)-2, 2, 6, 6-pentamethyl-4-hydroxypiperidine and 39.8 grams of the dimethyl ether of diethylene glycol (to depress the melting point of the piperidine alcohol) is placed in the flask and the mixture swept with nitrogen. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The charge is heated to a temperature of 140°C. and 0.25 gram of sodium hydride dispersed in 0.25 gram of mineral oil is added. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight gain after addition. The weight gain is 474 grams. After the addition is complete, the flask is swept with nitrogen and cooled below 50°C. and 0.62 milliliter of acetic acid is added to quench the catalyst. The product is caluclated to contain an average of 10.7 oxyethylene units and 5.6% of the dimethyl ether.

EXAMPLE 16

This example illustrates the preparation of 1-(2-hydroxyethyl)-2, 2, 6, 6-tetramethyl-4-hydroxypiperidine condensed with ethylene oxide in a molar ratio of 1:19.

A charge of 155 pounds (70.5 kilograms) 0f 2, 2, 6, 6-tetramethyl-4-hydroxypiperidine is placed in a stainless steel reactor equipped with a stirrer and 75 pounds (34 kilograms) of diethylene glycol dimethyl ether is added. The pressure in the reactor is reduced to 0.15-atmosphere and the reactor is then pressurized to 15 pounds per square inch (1.05 kilograms per square centimeter) gauge with nitrogen. The evacuation is repeated and the pressure is adjusted to 3 pounds per square inch (0.21-kilogram per square centimeter) gauge with nitrogen. The purged charge is stirred and heated to 125°C.; a sample taken at this point contains <0.2% water.

Ethylene oxide, 48 pounds (22 kilograms), is added at 125°C. at such a rate that the temperature rises to 145° to 155°C. The reactor is equipped with valves such that the ethylene oxide flow is stopped if the pressure exceeds 30 pounds per square inch (2.1 kilograms per square centimeter) gauge or if the temperatue exceeds 150°C. The charge is stirred at not less than 125°C. for 8 hours. A sample taken at this point contains not more than 1% unreacted 2, 2, 6, 6-tetramethyl-4-hydroxypiperidine.

The catalyst, 0.25-pound (0.11-kilogram) of sodium hydride dispersed in 0.25-pound (0.11-kilogram) of mineral oil is added at 125°C. and the charge is stirred and swept with nitrogen for 1 hour. The evacuation and pressurization described above is then repeated, and 835 pounds (378 kilograms) of ethylene oxide is added as described above. the ethylene oxide feed is shut off and the pressure is allowed to reduce via reaction of the ethylene oxide.

The charge is allowed to cool to 115°C., the reactor is evacuated to 15 pounds per square inch (1.05 kilograms per square centimeter), pressurized with nitrogen to 20 pounds per square inch (1.4 kilograms per square centimeter) gauge, re-evacuated to 15 pounds per square inch (1.05 kilograms per square centimeter) and re-pressurized with nitrogen to 20 pounds per square inch (1.4 kilograms per square centimeter). A sample taken at this point is analyzed by nuclear magnetic resonance, and contains 18–22 units of condensed ethylene oxide. This product is referred to as ETHP-19EO.

Acetic acid, 0.62 pound (0.28 kilogram) is then added and the charge is stirred for one hour. It is then cooled to 70°C. and discharged to containers.

EXAMPLE 17

This example illustrates the preparation of 1-(2-hydroxyethyl)-2, 2, 6, 6-tetramethyl-4-hydroxypiperidine condensed with ethylene oxide in a molar ratio of 1:36 and in a molar ratio of 1:114.

Into a 5-liter flask equipped with a thermometer, a mechanical stirrer, a gas-feed tube and a vertical condenser having a bubbler attached to its exit tube, is placed a charge of 76.5 grams of ETHP-19EO. The charge is heated to 150°C. and purged with nitrogen for 1 hour while maintaining the temperature at 150°C. The charge is cooled, 0.1 gram of sodium hydride in 0.1 gram of mineral oil is added and the charge is reheated to 150°C. Ethylene oxide gas, 130 grams, is added. A portion of the material is removed, and the catalyst in this portion is quenched with 0.2 milliliter of acetic acid. The waxy product has a neutralization equivalent of 1792.

The charge of ETHP-36EO remaining in the apparatus, 74 grams, is further treated with 155 grams of ethylene oxide at 150°C. The charge is cooled to 100°C. and the catalyst is quenched with 0.2 milliliter of acetic acid. The waxy solid has a neutralization equivalent of 5201.

EXAMPLE 18

This example illustrates the preparation of 1-(2-hydroxy-2-methylethyl)-2, 2, 6, 6-tetramethyl-4-hydroxypiperidine condensed with ethylene oxide in a molar ratio of 1:19.

A 5-liter flask fitted with a thermometer and a capillary nitrogen inlet is weighed and a charge of 1-(2-hydroxy-2-methylethyl)-2, 2, 6, 6-tetramethyl-4-hydroxypiperidine is placed in the flask. The setup is warmed to 90°C. and held at 1–2 torr for 0.5-hour to remove water and volatile acidic components, such as carbon dioxide. The charge is cooled and reweighed; the charge residue weighs 155 grams. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The apparatus is purged with nitrogen for 10 minutes, and then heated to a temperature of 100°C. and 0.5 gram of sodium hydride dispersed in 0.5 gram of mineral oil is stirred in and the charge is purged with nitrogen. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight of flask and contents after addition. After the addition is complete, the flask is swept with nitrogen and cooled below 50°C. The condenser is removed and the flask weighed. The weight gain is 600 grams. Acetic acid, 1.25 milliliters, is then added and the mixture is stirred for 10 minutes to quench the catalyst. The product is calculated to contain an average of 19 oxyethylene units.

EXAMPLE 19

This example illustrates the use of PHP-10EO in the preparation of acid-dyeable polyester filaments.

In a 2-liter, round-bottomed flask are placed 500 grams of di(2-hydroxyethyl) terephthalate and 0.28-gram of antimony oxide catalyst suspended in 20 milliliters of ethylene gylcol and 0.3-gram of manganese hydrogen phosphate. The flask is alternately evacuated to <2 torr and filled with nitrogen to atmospheric pressure five times. The flask is lowered into a salt bath at 245°C. and, when the monomer is molten, vacuum is applied to cause distillation of ethylene glycol. (The loss of some di(2-hydroxyethyl) terephthalate at this point is unavoidable.) When the pressure has been reduced to <1 torr, the vacuum is broken with nitrogen, and 27.4 grams of PHP-10.1EO is added. The pressure is again reduced to <1 torr and the temperature is raised to 285°C. in about 0.5-hour. After 1 hour at 285°C. and at <1 torr, the vacuum is broken with nitrogen and the polymer is allowed to cool.

The polymer is then broken up, cut to flake, and solid-phase polymerized for 5 days.

The flake is spun into a 17-filament yarn at a pack-block temperature of 259°C. and a spinneret temperature of 261°C. The yarn polymer has a relative viscosity of 14.1. The yarn is drawn 4.8X in two stages. The yarn passes from a feed roll at 18.4 yards (16.8 meters) per minute, over a pin having a temperature of 80°C. at 58.5 yards (53.5 meters) per minute, over a heated plate maintained at 96°C. at 98.9 yards (90.4 meters)

per minute and is then wound up at 98.4 yards (90.0 meters) per minute. The yarn has a denier of 47, a tenacity of 3.2 grams per denier, and an elongation of 30%. Three yarns prepared as above are plied together and knit into fabric. The yarn polymer contains 0.145% nitrogen.

In the following treatments, the scour and dye baths use bath-to-fabric weight ratios of 40:1.

The fabric is scoured for 30 minutes at the boil in a bath containing 1% of wetting agent and 1% of tetrasodium pyrophosphate and rinsed with hot water. The wetting agent is the product obtained by condensing 1 molecular proportion of octylphenol with 9–10 molecular proportions of ethylene oxide.

The fabric is dyed in baths having a pH of 3.0, 4.5, and 6.0 at 121°C. in a pressure dyer with dye carrier. Each bath contains 2% owf of C.I. Acid Blue 25 (C.I. 62055) and 15% owf of dye carrier. The dye carrier is a composition comprising about 50% methyl p-toluate, 25% methyl benzoate and 25% biphenyl. The fabrics are held in the baths for 90 minutes. The dyed fabrics are scoured 30 minutes at 82°C. in a bath containing, by weight, 1% of the wetting agent and 0.5% acetic acid. The fabrics all dye to a deep blue shade.

A second set of dyeings are made as described above, except that the temperature is about 100°C. Again, all fabrics are dyed to a deep blue shade.

EXAMPLE 20

This example illustrates the use of ETHP-19EO in the preparation of acid-dyeable polyester filaments.

Monomer is prepared from 1010 grams of dimethyl terephthalate, 645 milliliters of ethylene glycol and 0.454-gram of $Mn(C_2H_3O_2)_2 \cdot 4H_2O$ and 0.312-gram of $Sb_2O_3$ in 52 milliliters of ethylene glycol. The mixture is heated in a flask arranged for stirring and distillation, until 415 milliliters of methanol (332 grams) is removed. Then 0.215-gram of commercial 85% $H_3PO_4$ in 21 milliliters of ethylene glycol and 31.1 grams of adipic acid are added. Distillation is continued until the vessel reaches 241°C. and 160 grams of additional distillate is collected. The monomer product is cooled and broken into small pieces.

Monomer product, equivalent to 150 grams of polymer, is partially polymerized at 275° to 277°C. by reducing the pressure to 1 torr. The vessel is pressurized with nitrogen and 9.16 grams of ETHP-19EO are added. Polymerization is continued at 276° to 279°C. at 0.08-torr for 1 hour and 16 minutes. This polymer has a relative viscosity of 25.5 and contains 0.086% nitrogen and 4.27 mole % adipate units.

The polymer is then spun into a 14-filament yarn at 278°C. and wound up at 119 yards (108.8 meters) per minute. The yarn is drawn 5.6× as it passes from a feed roll heated at 70°C. at 18 yards (16.5 meters) per minute over a plate heated at 90°C. and to draw roll heated at 118°C. at 101 yards (92.4 meters) per minute. The yarn is relaxed at 180°C. for 5 minutes. This yarn has a tenacity of 2.3 grams per denier and an elongation of 88%. The yarn is dyed 90 minutes at 100°C. at pH 4.0 with 3% owf Acid Blue 40 (C.I. 62125), using a bath-to-yarn weight ratio of about 100:1. The yarn dyes to a medium shade.

We claim:

1. A mixture of alkylene oxide condensates which consists essentially of ring-substituted 2, 2, 6, 6-tetramethylpiperidine, having a substituent at the 1 position and/or a substituent at the 4 position of the ring, at least one of said substituents being an oxyalkyl substituent comprising polyoxyethylene and/or polyoxypropylene groups attached to the nitrogen atom of the ring through an alkylene group of 2 to 18 carbon atoms attached to the ring at the 4 position through an oxygen atom, the average number of oxyethylene and/or oxypropylene units per condensate being 3 to 200.

2. A product as defined in claim 1 which is a mixture of alkylene oxide condensates of 1-alkyl-2, 2, 6, 6-tetramethyl-4-hydroxypiperidine wherein the alkyl group has 1 to 18 carbon atoms.

3. A product as defined in claim 2 which averages 10 to 80 alkylene oxide units per tetramethylpiperidine ring.

4. A product as defined in claim 1 which is a mixture of alkylene oxide condensates of 1-alkoxymethyl-2, 2, 6, 6-tetramethyl-4-hydroxypiperidine wherein the alkoxy group has 1 to 18 carbon atoms.

5. A product as defined in claim 1 which is a mixture of alkylene oxide condensates of 1-hydroxyalkyl-2, 2, 6, 6-tetramethylpiperidine wherein the hydroxyalkyl group has 2 to 18 carbon atoms.

6. A product as defined in claim 1 which is a mixture of alkylene oxide condensates of 1-hydroxyalkyl-2, 2, 6, 6-tetramethyl-4-hydroxypiperidine wherein the hydroxyalkyl group has 2 to 18 carbon atoms.

7. A product as defined in claim 6 which averages 10 to 80 alkylene oxide units per tetramethylpiperidine ring.

8. A product as defined in claim 1 which is a mixture of alkylene oxide condensates of 1, 1'-alkylene-bis-(2, 2, 6, 6-tetramethyl-4-piperidinol) wherein the alkylene group has 2 to 18 carbon atoms.

9. A product as defined in claim 1 which is a mixture of ethylene oxide condensates of 1, 2, 2, 6, 6-pentamethyl-4-hydroxypiperidine averaging about 20 ethylene oxide units per tetramethylpiperidine ring.

10. A product as defined in claim 1 which is a mixture of ethylene oxide condensates of 1-(2-hydroxyethyl)-2, 2, 6, 6-tetramethyl-4-hydroxypiperdine averaging about 20 ethylene oxide units per tetramethylpiperdine ring.

* * * * *